United States Patent Office 3,637,656
Patented Jan. 25, 1972

3,637,656
PREPARATION OF STARCH DERIVATIVES
Felix Joseph Germino, Palos Park, and Joseph Ronald Caracci, Chicago, Ill., assignors to CPC International Inc.
No Drawing. Filed Oct. 28, 1968, Ser. No. 771,295
Int. Cl. C08b 19/01
U.S. Cl. 260—233.3 R          6 Claims

ABSTRACT OF THE DISCLOSURE

Starch derivatives are produced without the use of gel-retarding salts by forming a mixture of 10-40 percent by weight starch in water, adding to the mixture, a reagent, and derivatizing the starch by reacting it with the reagent at temperatures between about 225°–400° F. The derivatization reaction effected, is substantially homogeneous and may be carried out in a continuous process if desired.

This invention relates to processes for derivatizing starch. More particularly, this invention relates to processes for homogeneously derivatizing starch without the use of gel-retarding salts.

Many processes have been developed for reacting a reagent with a starch to form a derivatized starch product. Generally speaking, these processes are of two separate types. The first type of process comprises reacting a reagent with a starch in a high solids content aqueous medium in the presence of a gel-retarding salt, which salt prevents pasting or gelling during the reaction, and washing or otherwise removing the salt from the derivatized product. Although this type of process provides large bulk yields of derivatized products, the products so formed are generally heterogeneous in nature. Further, the particular derivatives produced and their amounts are generally unpredictable. Since industries which use derivatized starches are generally desirous of obtaining a specific derivative, and only that derivative, the unpredictability of this type of process presents a very real problem indeed. In addition, the necessity of removing the gel-retarding salt from a product introduces an added step into the system, which step increases the cost of the final product.

In order to circumvent the above-described problems, there has been developed a second type of process for derivatizing starch. Basically, this process, refered to as a "paste process," comprises forming a water slurry of starch and adding to the slurry a reagent, whereupon the reagent reacts with the starch to form a starch derivative.

Although this type of process produces a more uniform and homogeneous product and eliminates the need for salt removal, it was found that in the "paste processes" heretofore used, the upper limit of the solids content (i.e. starch content) by weight in the slurry was 10 percent. This was due to the fact that as solids contents above 10 percent, too much gelling took place for an adequate, economic, and ofttimes operative reaction to occur. By having to use slurries of 10 percent or less of starch, yields were materially decreased while drying costs for the final products became prohibitive. Thus, while the "paste processes" substantially reduced the problem of heterogeneity and eliminated the need for a salt removal step, they gave rise to other problems, more serious than the ones which they solved.

This invention now provides various processes for producing predictable and substantially homogeneous starch derivatives which processes may broadly be considered of the "paste process" type. However, the processes provided by this invention radically differ from the "paste processes" heretofore developed, in that the processes of this invention produce high yields of derivatized starch products and at the same time materially reduce the amount of drying which must be carried out on the product to place it in final form.

Basically the processes of this invention comprise forming a mixture comprised of starch, water, and reagent, wherein said starch is present in an amount of from about 10-40 percent and preferably 15-35 percent by weight of said water, and derivatizing said starch by heating said mixture to a temperature between about 225°–400° F. By using, in combination high temperatures and increased starch content, it has been found, quite unexpectedly, that the phenomenon of gelling which heretofore presented a prohibitive problem to the "paste process" art, no longer presents a material problem in starch derivative production. In view of the increased amount of starch now capable of being used, not only are yields materially increased but much less drying is required to place the product in final form.

It is believed that the above-described advantages are achieved by this invention because the reaction temperatures used, in combination with the increased starch content, are sufficiently high to form a molecular dispersion of the starch in the water. As a result of the formation of this molecular dispersion or molecularly dispersed state, there is better reactant mobility. Better reactant mobility, in turn, increases homogeneity of reaction and decreases the tendency of the system to form a gel.

The term "molecular dispersion" is used synonymously with the term "molecularly dispersed state." Both terms are well understood in the art and describe a dispersion wherein individual molecules of starch tend to disperse and separate themselves from one another.

The terms "starch derivatives," "derivatized starch" and the like are conventional terms in the art and are used herein according to their well known meaning. That is to say, they refer to a product produced by reacting a starch with a reagent, which reagent, or a part thereof, forms a component member of the starch molecule. This is usually accomplished by using a reagent which reacts with one or more of the alcohol groups of the glucopyranose units in a starch molecule to thereby form an ether or an ester. Well known starch ethers and esters are generally produced by reacting an acid, acid anhydride, alkyl halide, alkylene oxide, isocyanate, nitrile, or sulfonium reagent with starch.

The present invention is generally applicable to the production of all starch derivatives, as well as to the use of all starches and reagents therefor. In some instances, this invention actually allows for the production of new starch derivatives, heretofore unattainable in commercial quantity, since it provides for higher temperatures and increased reactant mobility. Increased reactant mobility, of course, increases the efficiency of a desired reaction without the presence of gel-retarding, heterogeneous reaction-producing, salts.

A preferred group of starches for the purposes of this invention are the well known granular starches. Examples of these starches include corn, tapioca, wheat, potato, rice, sago, and grain sorghum starch. Of these starches, cornstarch has been found particularly preferred for the purposes of this invention.

Preferred reagents for the purposes of this invention are numerous indeed and differ widely from one another in the chemical and physical properties. The reagents used may form either cationic or anionic starch derivatives when reacted with the above-described starches. Some examples of preferred reagents include: acrylonitrile, acrylamide, ethylene oxide, propylene oxide, trimethylamine sulfur trioxide complexes, acetic anhydride, isotoic anhydride, acrolein, lauryl chloride, the sodium salt of chloroacetic acid, 2-diethylaminoethyl chloride, 2,3-epoxy-1-diehylaminopropane, 2,3-epoxypropyl amine quaternaries, such as trimethyl, 2,3-epoxypropyl amine quaternary.

It is preferable, for the purpose of this invention to use a reagent which is soluble in water, at least at the temperature of reaction. Such a characteristic insures better mobility of the reagent and thus increased homogeneity of reaction. It is not always possible, however, to choose a water soluble reagent to form a desired starch derivative. Although insoluble reagent may then be used, it is preferable to include within the water phase of the reaction mixture a liquid which is miscible in water, and in which the reactant is soluble. Such a liquid provides a better distribution of the reagent throughout the system. When such a liquid is used, the reagent may be added to the starch-water slurry by first dissolving it in the liquid and then adding the liquid to the slurry or mixing the water, liquid, starch, and reagent together simultaneously to thereby form the total reaction mixture. Other ways of forming such a reaction mixture are, of course, clear to the skilled artisan and are therefore incorporated herein by reference. Examples of these water-miscible liquids include: the alkanols such as methanol, ethanol, isopropanol, acetone, dioxane, and the like. In practice, it is preferred when using these liquids, to use sufficient pressures during the reaction so that they will not evaporate from the system and precipitate the reagents.

Liquid solvents, including those given above, may be added to the water of the reaction mixture or effect purposes othert than that of serving as a distributing medium for the reagent. Such solvents may be used either in major or minor amounts with the water, but are preferably used in minor amounts.

In practice, the basic process of this invention as described hereinabove may assume many forms and types. It may be carried out either as a batch process or as a continuous process. Preferably, the process used is a continuous one.

A particularly preferred manner for effecting a continuous process of derivatization starch as contemplated by this invention may be carried out in a conventional continuous autoclave. To this autoclave there is continuously fed a reaction mixture comprised of water, 10–40 percent (and preferably 15–35 percent) starch by weight water, and a selected reagent in an amount slightly in excess of the stoichiometric requirements of the system. The autoclave's electrical heaters are then set at a temperature sufficient to insure that the temperature of the reaction mass will be from 225°–400° F. and preferably from 250°–350° F. For most conventional autoclaves such reaction mass temperatures are usually assured by setting the block temperature about 200° F. higher than the required reaction mass tempertaure when residence time within the autoclave is about 5 minutes.

Pressure within the autoclave will be dependent upon temperature and generally is from between about 10 to 200 p.s.i. In those instances where a volatile liquid solvent has been added to the water, overt control of pressure may be provided by any conventional means to insure against undue evaporation.

When the above technique is used; that is to say, when the above-described high temperatures and increased starch content is used according to this invention, a paste will occur which will result in a molecular dispersion of the starch throughout the reaction mixture. Uniformity, homogenity, and predictability of the reaction product result, thus substantially solving the problems which heretofore plagued the prior art.

The following examples are presented as illustrative of this invention. As such, they are not meant as limitations thereto.

EXAMPLE 1

A substantially uniform and homogeneous cyanoethyl starch product is produced by the following procedure:

A slurry of water and 21.5 percent (by weight water) cornstarch is formed. To 3500 parts by weight (e.g. 3500 gms.) of this slurry there is added 3.2 parts by weight NaOH (e.g. 3.2 gms. NaOH in 100 ml. $H_2O$) to assure a basic medium and 32 parts by volume (e.g. 32 ml.) acrylonitrile. This mixture is then fed continuously to a conventional autoclave provided with electrical heaters at a flow rate of 100 parts by volume per minute (e.g. 100 ml./min.). The block temperature of the autoclave is set at 565° F. and the exit temperature of the reaction mass is found to be 350° F. The upstream pressure is 220 p.s.i. and the downstream pressure is 140 p.s.i. The product issuing from the autoclave is collected in a suitable container, cooled, and dried on conventional drying rollers. The dried product is then dialyzed and analytically tested with the following results.

TABLE I

|  | Undialyzed product | Dialyzed product |
|---|---|---|
| Dry substance | 91.8 | 86.7 |
| Percent nitrogen | 0.61 | 0.63 |
| Sulfated ash | 0.67 | 0.25 |

The product is found to be a substantially homogeneous cyanoethyl starch.

EXAMPLE 2

In this experiment the procedure of Example 1 was followed with the exception that the starch was reacted with a sodium salt of chloroacetic acid to yield a carboxy methyl starch derivative.

EXAMPLE 3

To 200 ml. of water which contained 2.67 grams of sodium hydroxide and 39 grams of trimethyl, 2,3-epoxy propyl amine quaternary, was added 540 grams of starch.

The mixture was heated in an electrically heated laboratory scale continuous autoclave by passing the mixture through the system at the rate of 60 ml./minute. The total residence time was 5–6 minutes. The block temperature of the autoclave was 560° F. and the paste temperature 365° F. The reaction was effected under a pressure of 20 p.s.i.

The product was precipitated with methanol, filtered and dried. Analysis of the product was:

|  | Percent |
|---|---|
| Dry substance | 86.4 |
| Nitrogen | 0.2 |
| Sulfated ash | 1.0 |

EXAMPLE 4

A substantially uniform and homogeneous starch propionamide product is produced according to the following procedure:

A reaction mixture as in Example 1 is formed except that 56.7 parts by weight (e.g. gms.) of acrylamide are used instead of acrylonitrile. The same procedure as in Example 1 is followed using reaction conditions as follows:

Exit temperature—320° F.
Block temperature—550° F.
Upstream pressure—210 p.s.i.
Downstream pressure—150 p.s.i.
Flow rate—170 ppv./min. (e.g. 170 ml./min.)

Analysis of the final product revealed the following:

TABLE 6

|  | Undialyzed product | Dialyzed product |
|---|---|---|
| Dry substance | 90.3 | 86.5 |
| Percent nitrogen | 1.26 | 0.19 |
| Sulfated ash | 0.93 | 0.28 |

The product formed is found to be a substantially homogeneous starch propionamide.

EXAMPLE 5

In this example propylene oxide is reacted with starch according to the process of the invention to yield a hydroxy propyl starch derivative. The reaction is carried out in a continuous manner using a steam injection cooker.

Specifically, a slurry of 800 g. d.b. corn starch and 3200 g. of water is prepared. To this is added 100 ml. of a 4% sodium hydroxide solution and 30 g. of propylene oxide. This mixture is fed continuously to the steam injection heater. The following reaction conditions are followed:

Steam pressure—140 p.s.i.
Upstream pressure—120 p.s.i.
Downstream pressure—100 p.s.i.
Paste temperature—345° F.

The product is collected and dried as described in Example I. Analysis of the final product reveals the following:

TABLE 3

|  | Undialyzed product | Dialyzed product |
| --- | --- | --- |
| Dry substance | 89.0 | 88.2 |
| Percent propylene oxide | 3.1 | 1.1 |
| Sulfated ash | 0.72 | 0.15 |

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A process for producing a homogeneous starch derivative which comprises:
   forming a reaction mixture which comprises:
   starch, water, an alkali hydroxy base and a reagent capable of reacting with said starch to produce said starch derivatives, said reagent being chosen from the group consisting of an acid anhydride, an alkyl halide, an alkylene oxide, an isocyanate, a nitrite, a sulfonium reagent, a 2,3-epoxy propyl amine quaternary and a sodium salt of chloroacetic acid, and being present in an amount slightly in excess of the stoichiometric requirements of the system, said starch being present in an amount of from about 15% to about 40% by weight of said water,
   feeding said mixture into an autoclave, said mixture being subjected to temperatures of about 225° F. to about 400° F. and pressures of from about 10 to about 200 p.s.i., to effect a molecular dispersion of said starch,
   reacting said mixture in said autoclave for about up to 5 to about 6 minutes and
   recovering said reacted product issuing from said autoclave.

2. A process according to claim 1 wherein the reagent is water insoluble and is dissolved in a water miscible liquid, said liquid being an alkanol selected from the group consisting of a short chain monohydric alcohol, acetone, and dioxane.

3. A process according to claim 1 wherein said reagent is acrylonitrile.

4. A process according to claim 1 wherein said reagent is acrylamide.

5. A process according to claim 1 wherein said reagent is propylene oxide.

6. A process according to claim 1 wherein said reagent is trimethyl, 2,3-epoxy propyl amine quaternary.

References Cited
UNITED STATES PATENTS

| | | | |
|---|---|---|---|
| 2,813,093 | 11/1957 | Caldwell et al. | 260—233.3 |
| 2,884,412 | 4/1959 | Neukom | 260—233.5 |
| 3,065,223 | 11/1962 | Brockway et al. | 260—233.5 |
| 3,069,410 | 12/1962 | Smith et al. | 260—233.5 |
| 3,070,594 | 12/1962 | Harris et al. | 260—233.3 |
| 3,100,203 | 8/1963 | Borchert | 260—211 |
| 3,137,592 | 6/1964 | Protzman et al. | 127—32 |
| 3,208,998 | 9/1965 | Fisher et al. | 260—233.3 |
| 3,243,426 | 3/1966 | Caesar | 260—233.3 |
| 3,342,806 | 9/1967 | Chaudhuri | 260—233.5 |
| 3,467,647 | 9/1969 | Benninga | 260—209 |

DONALD E. CZAJA, Primary Examiner

M. I. MARQUIS, Assistant Examiner

U.S. Cl. X.R.

260—233.5 R